United States Patent [19]

Brooks

[11] Patent Number: 4,594,270

[45] Date of Patent: Jun. 10, 1986

[54] BED SAMPLER FOR A HIGH-TEMPERATURE FLUIDIZED BED

[75] Inventor: Lionel H. Brooks, Austin, Tex.

[73] Assignee: Carbomedics, Inc., Austin, Tex.

[21] Appl. No.: 646,569

[22] Filed: Aug. 31, 1984

[51] Int. Cl.[4] .......................... B05C 3/08; B05C 3/04
[52] U.S. Cl. .................................. 427/213; 118/303; 118/716; 427/255.5; 427/249
[58] Field of Search ............... 118/303, DIG. 5, 716; 427/6, 213, 249, 255.5

[56] References Cited

U.S. PATENT DOCUMENTS

| | | | |
|---|---|---|---|
| 3,179,378 | 4/1965 | Zenz et al. | 118/DIG. 5 |
| 3,977,896 | 8/1976 | Bokros et al. | 427/213 |
| 4,011,832 | 3/1977 | Westervelt et al. | 118/DIG. 5 |
| 4,100,883 | 7/1978 | Lupinski et al. | 118/DIG. 5 |
| 4,217,127 | 8/1980 | Kono et al. | 118/DIG. 5 |

Primary Examiner—Shrive P. Beck

Attorney, Agent, or Firm—Fitch, Even, Tabin & Flannery

[57] ABSTRACT

Fluidized bed apparatus for use in applying a coating, having a relatively lesser density to particles, having relatively greater densities, by causing passage of a gaseous atmosphere through a bed of the particles. The apparatus includes an enclosure for holding and heating a bed of the particles. A valve network for causing the flow of the gaseous atmosphere carrying a material for forming the coating upward though the bed of particles to fluidize the particles, is provided. The apparatus further includes a conveyor for adding seed particles to the bed and a spillover for removing particles from the bed upon its achieving a predetermined level to limit the height of the bed. The apparatus also has a selectively operable sampler for removing sample of the contents of the bed at a level below the predetermined maximum level.

9 Claims, 1 Drawing Figure

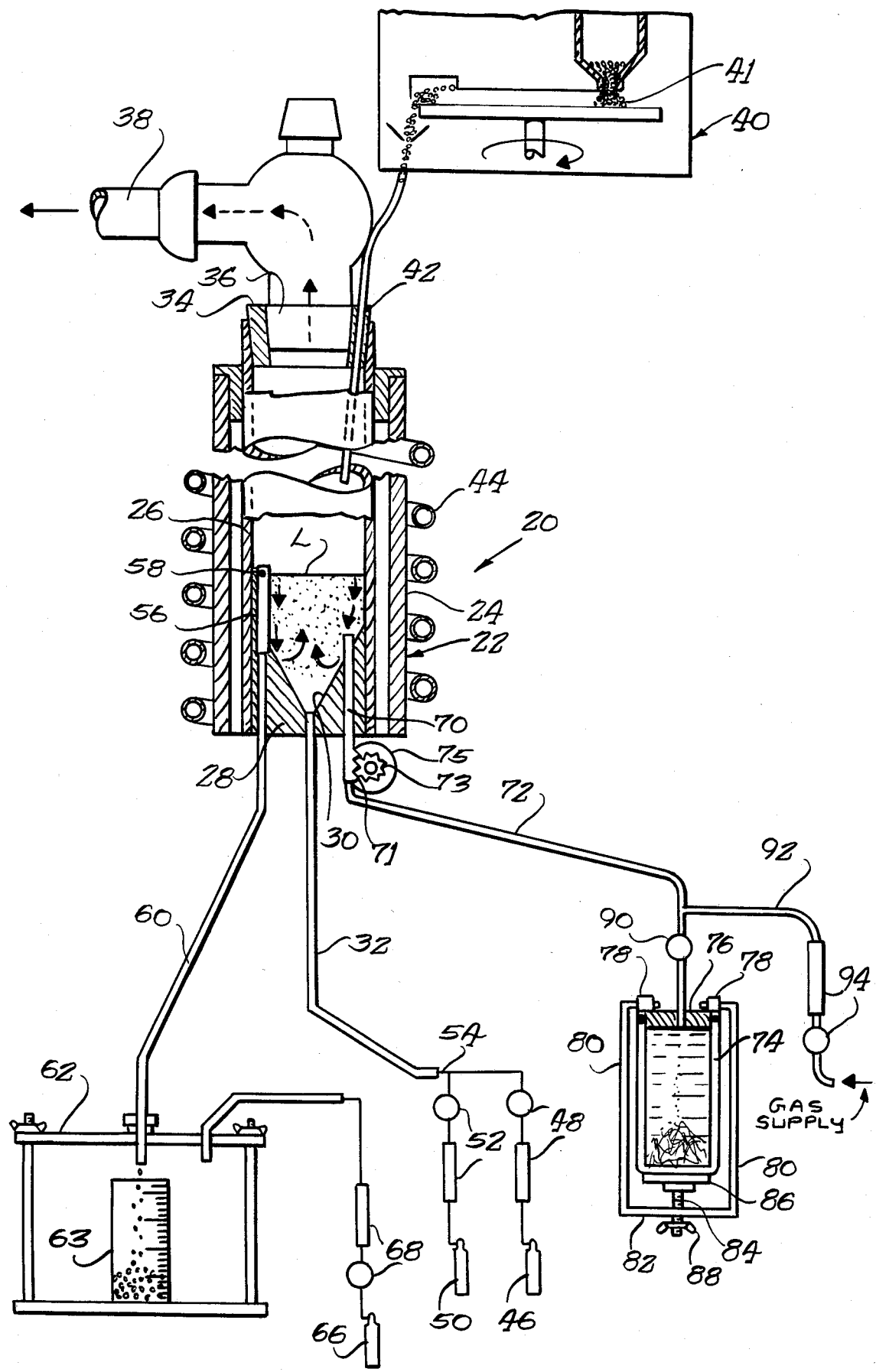

BED SAMPLER FOR A HIGH-TEMPERATURE FLUIDIZED BED

BACKGROUND OF THE INVENTION

This invention relates to apparatus for sampling the contents of an enclosure and, more particularly, to a method and apparatus for sampling particles in a high temperature fluidized bed.

It is desirable to deposit pyrolytic carbon coatings on certain objects. For example, uranium particles can be coated with pyrolytic carbon which can form a pressure-retentive shell allowing the coated particles to be fabricated into fuel rods for use in nuclear reactors. Another important use for such coatings is for heart valve and other biomedical components because of a pyrolytic carbon coating does not react with blood.

Pyrolytic carbon is usually deposited on an object by thermally decomposing gaseous hydrocarbons or other carbonaceous substances in vaporous form in the presence of the object. When pyrolytic carbon is deposited in a fluidized bed apparatus, one of the variables upon which the structure of the pyrolytic carbon will be dependent is the amount of available deposition surface area relative to the volume of the furnace enclosure wherein the deposition is occurring. Pyrolytic carbon having a microstructure of smaller growth features will be deposited when the relative amount of deposition surface is fairly high. Thus, when relatively large objects, for example, objects having at least one dimension equal to 5 mm. or more, are being coated, an ancillary bed of small particles (usually of a size measured in microns) is included within the furnace enclosure together with the large objects. This arrangement provides sufficient available total surface area to assure that pyrolytic carbon having the desired crystalline form will be deposited. In addition, the random motion of large objects in fluidized beds provides for a relatively uniform deposition of carbon on all surfaces.

However, whenever such submillimeter particles are being coated in a fluidized bed, the total surface area of the particles begins to increase significantly as the diameters of the pyrolytic carbon-coated particles grow. This change in the available deposition surface area in the fluidized bed will result in a change in the physical characteristics of the pyrolytic carbon being deposited if the other coating variables are held constant, e.g., coating temperature, gas flow rate and gas composition; and moreover, when the bed reaches some maximum size, it will collapse and thus limit the thickness of the carbon coating that can be deposited on levitated substrates under constant input conditions. Changes in the physical characteristics of the carbon deposited may be undesirable for any of a number of reasons.

It has been found that pyrolytic carbon having good structural strength and uniform physical properties can be deposited as relatively thick coatings upon relatively large objects in the accompaniment of particles if the available fluidized bed surface area is maintained relatively constant by withdrawing particles which have become enlarged in size as a result of coating and feeding smaller size particles into the deposition enclosure. Commonly assigned U.S. Pat. No. 3,977,896, the teachings of which are hereby incorporated by reference, is directed to this type of process for depositing pyrolytic carbon coatings. In that patent, the flow of gaseous atmosphere is introduced beneath and generally centrally of the particle bed. Seed particles having relatively greater densities than that of the coating are introduced to the bed causing the coated particles to levitate where they can be removed through a withdrawal tube, the open end of which is positioned near the top of the bed. The rate at which the particles are removed is controlled by regulating the rate of flow of an inert gas up the tube. The seed particle input can be at a constant rate, and the output is measured so that by varying the purge gas flow rate to regulate the output, a substantially constant bed total surface is achieved.

While such a coating process works well, the need for measuring the output and varying the purge gas flow rate in response thereto introduces certain complexities which it is desirable to avoid. It has been found that, in many coating applications, proper coating can be achieved by maintaining the bed at a predetermined level. The fluidized bed coating process usually requires an operating temperature of between 1200° and 2000° C. Prior art sensors for detecting bed level to control the rate of addition or removal have been unreliable under these fluidized bed operating conditions. A level controller incorporating a weir tube for maintaining a predetermined bed level by removing particles at the top of the bed is disclosed in commonly assigned U.S. patent application Ser. No. 604,028, filed April 26, 1984, the teachings of which are hereby incorporated by reference.

It is desirable to sample the contents of the bed during the coating process. An analysis of such a sample, e.g., a screen analysis to determine the proportions of particle sizes making up the sample, could indicate an adjustment in one of the coating parameters (such as temperature, seed particle addition rate, or flow rate of coating materials) is required to achieve more efficient coating. The output of the weir tube could be used although it only provides particles at the top of the bed. In order for the operator to have safe access to the weir tube collection container, the tube would need to be temporarily blocked. This would preclude the entrance of additional hot particles and noxious gases to the collection container when the operator is removing the sample. Of course, even temporary blocking of the weir tube interferes with its level stabilization function, thus introducing another complexity to the coating process.

SUMMARY OF THE INVENTION

One of the objects of the present invention is the provision of improved fluidized bed apparatus including means for sampling the contents of the bed during the coating process to insure proper progression of the coating process. The apparatus permits sampling without substantially affecting operation of a fluidized bed level controller incorporated in the apparatus. The sampler is safe and simple to operate because it permits full isolation of the sample collection container from the enclosure holding the bed of particles. Furthermore the sampler allows the sampled particles to be withdrawn at various levels within the fluidized bed. Additionally the fluidized bed apparatus of the present invention has long service life, is reliable in use and is simple and economical to manufacture. Other objects and features of the present invention will be, in part, apparent and, in part, pointed out more specifically hereinafter in the specification and in the attendant claims and drawing.

Briefly, fluidized bed apparatus of the present invention includes an enclosure holding a bed of particles, and means for causing flow, of a gaseous atmosphere carrying a material for forming a coating on the particles, upward through the bed of particles to fluidize them. The apparatus further includes means for adding seed particles to the bed and spillover means for removing particles from the bed upon its achieving a predetermined level to limit the height of the bed. Additionally, the apparatus includes selectively operable sampler means for removing at least one sample of the contents of the bed at a level below the predetermined level.

BRIEF DESCRIPTION OF THE DRAWING

The FIGURE is a front elevational view, partly sectional and partly schematic in nature, of fluidized bed apparatus of the present invention, including a weir tube for use in level control and a sampler tube for removing a sample of the contents of the bed during the coating process.

DESCRIPTION OF THE PREFERRED EMBODIMENT

Referring now to the drawing, fluidized bed apparatus for applying a pyrolytic carbon coating to objects is generally indicated by reference character 20. The apparatus includes a furnace 22 having a cylindrical outer shell 24. The furnace shell 24 supports the coating enclosure which is defined by a tube 26 having an insert 28 affixed thereto at its lower end. The insert 28 provides the internal coating enclosure with a conical bottom surface 30. A central passageway 32 extends vertically upward through the insert 28, coaxial with the tube 26, and the coating and fluidizing atmosphere is supplied upwardly through this passageway.

The upper end of the tube 26 is provided with a removable closure 34 that may be mounted in any suitable manner; the closure 34 includes a central exit passageway 36 through which the fluidizing and coating gases leave the furnace enclosure and which is connected to an exit conduit 38 through which the gases may be routed for subsequent treatment if desired. An injection device 40 is mounted above the closure and is designed to feed minute particles 41 into the coating enclosure at a desired rate by dropping them downward through an opening 42 in the closure where they will fall nearly the length of the tube 26 until they enter and become a part of the fluidized bed. Induction or alternative heating means 44, is provided for heating the active deposition region of the furnace and the particles and objects being coated to the desired deposition temperature.

In the fluidized bed coating apparatus 20, sometimes referred to hereinafter as a "steady-state bed", the bed of minute particles, submillimeter in size, are levitated generally near the bottom of the heating enclosure, in approximately the location shown, by the upward flowing gas stream. The gas stream is usually made up of a mixture of an inert fluidizing gas plus a carbonaceous substance, such as a gaseous hydrocarbon, for example, methane, ethane, propane, butane or acetylene, or some other carbon-containing substance that is gaseous or easily vaporizable. A source 46 of hydrocarbon is illustrated which is equipped with a flow-regulating valve arrangement 48. Also illustrated is a source 50 of inert gas, for example, helium, argon or nitrogen, which is likewise equipped with a suitable flow-regulating valve arrangement 52. These two sources flow into a common line 54 which connects to the vertical passageway 32 in the insert 28.

The total flow of the gas upward through the coating enclosure is regulated so that the fluidized bed occupies the region near the bottom of the tube 26 as shown. The upward flow of the gaseous atmosphere through the central passageway causes a generally annular flow pattern to be established in the fluidized bed region, with the minute particles traveling upward in the central portion of the enclosure and then downward generally along the outer perimeter thereof. When particles having a density of at least about 3 grams/cm$^3$ (i.e., greater than the density of the carbon coating) are used, they will gradually become less dense as they grow in size. The smaller uncoated particles tend to remain in the lower portion of the bed while the less dense coated particles are levitated to the upper portion of the bed. A preferred material for the particles is zirconium oxide which has a density of about 5.5 grams/cm$^3$.

The fluidized bed apparatus includes spillover means for removing particles from the bed upon the bed achieving a predetermined level. More specifically, a weir tube 56, formed of a refractory material, such as graphite or mullite, extends through a vertical hole in the enclosure insert 28 and through a portion of the bed of particles and thereabove adjacent a side of the bed. A spillover hole or entrance 58 in the tube 56 defines a predetermined maximum level L for the bed of particles. When this level is reached, the continuous addition of seed particles in concert with the fluidization of the bed caused by the upward flowing gas stream results in withdrawal of particles having substantial coating thicknesses. An exit conduit 60 receives the withdrawn particles from the weir tube 56 and channels them into a collection chamber 62 where they are received in a container 63.

The weir tube 56 is provided with a hood to close the upper end of the tube against the entrance of airborne particles and dust. Due to the fluidization process, there is some bubbling and splashing of the particles predominately in the central portion of the bed. When the bubbles burst, particles are sprayed generally radially with respect to the vertical axis of the bed. As the gas bubbles tends to pick up particles from adjacent the bottom of the bed, the sprayed particles tend to be the smaller, relatively thin-coated ones, and therefore, it is not desired that such particles be withdrawn. It is important that the spillover hole is positioned facing away from the central portion of the bed were the bubbling is most likely to occur. More specifically, the spillover hole should face at ninety degrees or greater with respect to the radius intersecting the axis of the weir tube. Furthermore, the weir tube is preferably disposed away from the axis of the bed by a distance equal to at least two-thirds of the distance between the bed axis and the tube 26. Since the particles which become airborne due to bubbling of the bed do not travel circumferentially, the positioning of the spillover hole 58 facing away from the central portion of the bed substantially eliminates the entrance of the airborne particles into the spillover hole.

The collection chamber 62 is preferably pressurized with inert gas from a suitable source 66 with the rate of gas flow controlled by a valve 68. The flow of inert gas through the collection chamber 62 and up the weir tube 56 through the exit conduit 60 acts as a purge to prevent substantial quantities of dust from falling down into the collection chamber thus maintaining clear the glass walls forming the chamber to permit observation by the operator that the apparatus is functioning properly. It will be appreciated that the flow of inert gas does not have to be varied as it would if it were to regulate the particle withdrawal rate as in U.S. Pat. No. 3,977,896. Here the purge gas flows at a constant, relatively slow rate sufficient to prevent movement of substantial quantities of dust into the collection chamber 62, but insufficient to prevent coated particles from falling down the weir tube 56 into the collection chamber.

The fluidized bed apparatus also includes selectively operable sampler means for removing samples of the contents of the bed at a bed level below level L. More particularly, the enclosure has an opening for receiving a sampler tube 70 in an interference fit. Preferably, the tube 70 is slidable with respect to the enclosure so that the level, at which the particle sample can be withdrawn, can be varied. For example, the tube could carry a rack 71 on its outside surface with the teeth of the rack engaged by those of a pinion 73 rotated by a motor 75 thus to selectively vary the level at which the sample can be taken. The tube 70, also formed of a suitable refractory material, extends into the particle bed terminating short of level L. The sampler tube is connected to a sample exit conduit 72 which channels the particle sample from the enclosure to a sample collection container 74.

As shown, the container 74 is provided with a seal 76, forming a cover for the container, having an opening for receiving the conduit 72. Attached to the seal are a pair of spaced trunnions 78 pivotally receiving the inwardly turned upper ends of arms 80 of a stirrup having a horizontal web 82 joining the arms 80. It will be understood that the trunnions are attached to a support structure, not shown. The web is provided with a centrally located threaded aperture receiving a threaded rod or thumbscrew 84, the upper end of which pivotally carries a presser foot 86 for urging the container 74 against the seal 76. The lower end of the rod is formed with a head 88 having the general shape of a wing nut and rotation of the rod moves the container toward or away from the seal. Thus, to remove a particle sample, the rod is loosened, and the container is supported by hand while the stirrup is pivoted about the trunnions to a noninterfering position.

A valve 90 is located in the conduit line 72 for selectively blocking it to isolate the sample collection chamber 74 from the particle bed. Sample particle flow control means is interconnected with conduit 72 between the sampler tube 70 and the valve 90. The flow controller includes a line 92 connecting the conduit 72 to a source of inert gas. A flow regulating valve arrangement 94 is provided for line 92. By operating the valve arrangement 94, a sufficient flow of inert gas can be supplied to prevent particles from entering the sample tube 70. On the other hand, the flow of gas through line 92 can be reduced to permit channelling of a particle sample through conduit 72 and an open valve 90 to collection container 74.

Operation of the apparatus of the present invention is as follows: After the sample tube 70 is set at the appropriate height and the flow control valve 94 opened to prevent particles from entering the sample tube 70, a supply of particles 41, along with the object or objects to be coated, are placed in the coating enclosure, and the enclosure is brought up to its operating temperature of 1200 to 2000 degrees Centrigrade with the fluidizing gas flowing. After the operating temperature is attained, the coating gas valve 48 is opened so that the coating gas and the fluidizing gas both flow through the input line 54. The bed level starts to rise slowly due to the particles in the bed acquiring pyrolytic carbon coatings as a result of the thermal decomposition of the gaseous carbonaceous substances. After a while, the injection device 40 is turned on to add seed particles 41 which increases the rate at which the bed rises. There is also some bubbling of the fluidized particles in the central region of the bed above the location of the central gas inlet passageway 32. Although such bubbling and splashing causes particle movement above the predetermined level L established by the position of the spillover hole 58 in the weir tube, such airborne particles cannot enter the tube 56 in significant quantity because the spillover hole faces away from the central bed region.

The circulation provided by the fluidization causes the less dense, coated particles to levitate; the just-added seed particles and the only lightly-coated particles, which have greater densities, are more likely to remain near the bottom of the bed. When the bed level reaches the spillover hole 58, particles enter the hole where they fall down the tube 56, through the exit conduit 60 and are collected in the container 63 disposed in chamber 62. The provision of the weir tube hood and the slow purge of inert gas up the weir tube 56 insure that the major portion of dust is removed through the exit conduit 38 and does not travel with the particles through the weir tube.

When the operator decides to take a sample of the contents of the bed, the sample valve 90 is opened; and thereafter, the particle sample flow control valve 94 is partially closed to allow sampled particles to fall into the sample collection container 74. It will be appreciated that flow control valve 94 can be adjusted as required during sampling to restrict the particle flow rate so that the sample valve does not become too hot to function (about 150° Centigrade). Upon collection of a sufficiently large sample, valve 94 is opened to prevent particles from entering sample tube 70 and valve 90 is closed to isolate the sample collection container 74 from the fluidized bed. Now the operator can safely remove the sample by turning the thumbscrew and swinging away the frame, without the possibility of encountering incoming hot particles or noxious gases.

After the sample is removed from the container 74, it can be cleaned and replaced for collection of another sample. If desired, the level of the tube can be selectively varied by operation of the motor 75 and another sample can be taken to further indicate the progress of the coating process. The collected sample(s) is analyzed, and based on the results of this analysis, one of the coating process parameters may be adjusted to promote more efficient coating during the ongoing coating operation. On the other hand, one of the parameters may not be adjusted until it is desired to "fine-tune" a subsequent coating operation. If during the coating process samples are taken at different levels, the results of analyses for the two samples could be compared to indicate further adjustments.

For example, during a control run of the coating process samples are taken at a preselected time at two different bed levels to determine the distribution of small and large particles. It is standard practice in the coating process to add seed particles more rapidly at the beginning and then slow the addition rate as the process continues. In the course of a subsequent production run, samples could be taken at the same time and at the same levels as in the control run. By comparison of the size distribution at the corresponding levels, a decision could be made as to how quickly the seed particle addition rate should be slowed. Thus, if the particle size distribution at the upper level indicated a greater percentage of small particles during the production run than in the control run, compensation could be made by more quickly slowing the seed particle addition rate.

Upon completion of the coating process, the apparatus 20 is disassembled and the coated objects are removed. It will be appreciated that the contents of the container 63 includes small and large particles. The contents can be screened and the large particles disposed of and the smaller ones recycled.

While the fluidized bed apparatus of the present invention has been described in terms of applying pyrolytic carbon coating to objects due to thermal decomposition of gaseous carbonaceous substances in the presence of the particles, it will be appreciated that the present invention is not limited to this particular use, but it has utility in other applications where coatings are to be applied to particles by flowing a gas stream including the coating material through a bed of the particles.

As a method of sampling the contents of a particle bed in fluidized bed apparatus, the present invention comprises the following steps:

(A) The gaseous coating atmosphere is flowed through the particle bed and seed particles are added.

(B) Particles are withdrawn from the top of the bed to maintain a predetermined bed level.

(C) The contents of the bed is sampled below this predetermined maximum bed level.

(D) The particle sample is analyzed.

Based upon the results of the particle sample analysis, one of the coating process parameters could be changed to promote more efficient coating.

It is noted that the sampling step mentioned above includes the following substeps:

(1) The flow control valve is operated to prevent substantial flow of sampled particles in the sample conduit.

(2) The conduit sample valve is opened.

(3) The flow control valve is operated to allow flow of sampled particles from the enclosure in the conduit to the sample collection chamber.

(4) The flow control valve is opened to prevent substantial flow of particles in the sample conduit.

(5) The sample valve is closed so that a substantial particle build up on the upstream side of the sample valve is prevented.

The method also includes the following optional step:

(E) The contents of the bed are again sampled, but at a different bed level than used in step (C). The second particle sample is analyzed and the results compared with those of the first sampling to indicate the efficiency of the coating process.

In view of the above, it will be seen that the several objects of the invention are achieved and other advantageous results attained.

As various changes could be made without departing from the scope of the invention, it is intended that all matter contained in the above description shall be interpreted as illustrative and not in a limiting sense.

What is claimed is:

1. Fluidized bed apparatus for use in applying a coating, having a relatively lesser density, to particles, having relatively greater densities, by causing passage of a gaseous atmosphere through a bed of said particles, said apparatus comprising:

an enclosure holding a bed of said particles;

means for causing flow of said gaseous atmosphere carrying a material for forming said coating upward through said bed of particles to fluidize said particles;

means for adding seed particles to said bed;

spillover means for removing particles from said bed upon said bed achieving a predetermined level thereby limiting the height of said bed; and selectively operable sampler means for removing at least one sample of the contents of said bed at a bed level below said predetermined level, said sampler means comprising a sample collector, conduit means for channelling said sample from said enclosure to said collector and valve means for selectively blocking said conduit means;

said conduit means comprising a withdrawal tube extending through said enclosure, into said bed and terminating short of said predetermined level, said enclosure having an opening for receiving said tube in an interference fit, said tube being slidable with respect to said enclosure so that the level at which said sample is withdrawn can be varied.

2. Apparatus as set forth in claim 1 further comprising flow control means interconnected with said conduit means between said enclosure and said valve means for regulating flow of the particle sample in said conduit means.

3. Apparatus as set forth in claim 2 wherein said flow control means comprises a gas supply line connected to said conduit means, and further comprises a valve for adjusting the gas flow rate in said line.

4. Apparatus as set forth in claim 1 further comprising means for sliding said tube to various sample withdrawal levels.

5. Apparatus as set forth in claim 1 wherein said spillover means comprises a weir tube.

6. Fluidized bed apparatus for use in applying a coating, having a relatively lesser density, to particles, having relatively greater densities, by causing passage of a gaseous atmosphere through a bed of said particles, said apparatus comprising:

an enclosure holding a bed of said particles;

means for causing a flow of said gaseous atmosphere, carrying a material for forming said coating, upward through said bed of particles to fluidize said particles;

means for adding send particles to said bed;

first tube means for controlling the contents of said enclosure by withdrawing particles to promote efficient coating of particles; and second tube means for selectively sampling the contents of said bed, said enclosure having an opening for receiving said second tube means in an interference fit, said second tube means being slidable with respect to said enclosure so that the level at which said sample is withdrawn can be varied.

7. A method of sampling the contents of a particle bed in fluidized bed apparatus of the type comprising an enclosure holding a bed of particles; means for causing flow of a gaseous atmosphere carrying a material for forming a particle coating, having relatively lesser density than the densities of said particles, upward through said bed of particles to fluidize them, and means for adding seed particles to said to said bed; said sampling method comprising the steps of;

(a) flowing said atmosphere through said bed and adding said seed particles;

(b) withdrawing particles from the top of said bed to maintain a predetermined bed level;

(c) sampling the contents of said bed below said predetermined level at different levels through the use of a tube received in an interference fit in an opening in said enclosure, said tube being slidable with respect to said enclosure; and (d) analyzing the samples withdrawn at said different levels.

8. A method as set forth in claim 7 further comprising the step of varying at least one of (a) the rate of flow of said atmosphere and (b) the rate of addition of seed particles, in accordance with the results of the analysis.

9. A method as set forth in claim 7 wherein said apparatus further includes a sample collector, conduit means for channelling said sample from said enclosure to said collector, valve means for selectively blocking said conduit means, and flow control means interconnected with said conduit means between said enclosure and said valve means for regulating the flow of the particle sample in the conduit means, said sampling step comprising the following substeps:

(1) operating said flow control means to prevent substantial flow of sampled particles in said conduit means;

(2) opening said valve means;

(3) operating said flow control means to allow flow of sampled particles in said conduit means;

(4) operating said flow control means as in substep (1); and (5) closing said valve means whereby a substantial particle buildup on the upstream side of the valve means is prevented.

* * * * *

UNITED STATES PATENT AND TRADEMARK OFFICE
CERTIFICATE OF CORRECTION

PATENT NO. : 4,594,270
DATED : June 10, 1986
INVENTOR(S) : Lionel Hepworth Brooks It is certified that error appears in the above-identified patent and that said Letters Patent is hereby corrected as shown below:

```
Column 1, line 16, after "because" delete --of--.
Column 1, line 29, after "surface" insert --area--.
Column 8, line 15, change ";" (semi-colon) to --,-- (comma).
Column 8, line 43, after "causing" delete --a--.
Column 8, line 47, change "send" to --seed--.
Column 8, line 65, after "to said" delete --to said--.
```

Signed and Sealed this

Fourth Day of November, 1986

[SEAL]

*Attest:*

DONALD J. QUIGG

*Attesting Officer*      *Commissioner of Patents and Trademarks*